United States Patent
Fay, II

(10) Patent No.: US 9,545,053 B2
(45) Date of Patent: Jan. 17, 2017

(54) SPRING PLATE CONFIGURED TO OVERLAP WITH ASYMMETRIC/ECCENTRIC QUICK CHANGE KNIFE NUT FOR PROPER ASSEMBLY

(71) Applicant: CNH INDUSTRIAL AMERICA, LLC, New Holland, PA (US)

(72) Inventor: Jeffrey Fay, II, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 287 days.

(21) Appl. No.: 14/262,596

(22) Filed: Apr. 25, 2014

(65) Prior Publication Data

US 2015/0305235 A1    Oct. 29, 2015

(51) Int. Cl.
*A01D 34/73* (2006.01)

(52) U.S. Cl.
CPC .................................. *A01D 34/733* (2013.01)

(58) Field of Classification Search
CPC ... A01D 34/733; A01D 34/736; A01D 34/664
USPC .................................................... 56/295, 255
See application file for complete search history.

(56) References Cited

U.S. PATENT DOCUMENTS

| | | | | |
|---|---|---|---|---|
| 3,418,793 A * | 12/1968 | Brewer | ................ | A01D 34/63 56/295 |
| 3,604,189 A | 9/1971 | Harer et al. | | |
| 3,894,385 A * | 7/1975 | Brown, Jr. | ............ | A01D 34/736 56/295 |
| 3,905,182 A * | 9/1975 | Geier | ................... | A01D 34/736 56/13.6 |
| 3,918,241 A * | 11/1975 | Stillions | ............... | A01D 34/733 56/12.7 |
| 3,950,923 A * | 4/1976 | Martensen | ........... | A01D 34/668 56/295 |
| 4,815,264 A * | 3/1989 | Mijnders | .............. | A01D 34/736 56/13.6 |
| 5,784,866 A * | 7/1998 | Campbell | ............ | A01D 34/665 56/13.6 |
| 6,019,574 A * | 2/2000 | DiBella | ................ | F01D 17/162 415/148 |
| 6,829,878 B1 * | 12/2004 | Hoffman | .............. | A01D 34/733 56/295 |
| 7,814,735 B2 * | 10/2010 | Neudorf | ............... | A01D 34/733 411/399 |
| 8,510,959 B2 | 8/2013 | Whitenight et al. | | |

(Continued)

FOREIGN PATENT DOCUMENTS

DE           20308046 U1     7/2003
GB             1447759         9/1976

*Primary Examiner* — Robert Pezzuto
*Assistant Examiner* — Mai Nguyen
(74) *Attorney, Agent, or Firm* — Peter K. Zacharias; Patrick M. Sheldrake

(57) ABSTRACT

A quick-release knife connector for use on a rotary disc cutterhead having an asymmetrically shaped knife nut with a first portion providing a bearing surface for an aperture in the knife and a second portion which inhibits axial movement of the knife from contact with the first portion. A capture spring having an aperture for partially receiving the second portion prevents accidental release of the knife. The asymmetric orientation of the second portion and placement of the aperture on the capture spring assures that the knife nut is properly oriented when installed.

8 Claims, 4 Drawing Sheets

(56) References Cited

U.S. PATENT DOCUMENTS

| | | | |
|---|---|---|---|
| 8,857,038 B2* | 10/2014 | Fay, II | A01D 34/733 29/525.01 |
| 2010/0101201 A1* | 4/2010 | Yanke | A01D 34/733 56/295 |
| 2013/0055546 A1 | 3/2013 | Fay, II | |
| 2013/0247530 A1 | 9/2013 | Heinrich | |
| 2014/0126952 A1* | 5/2014 | Fay, II | A01D 34/733 403/161 |

* cited by examiner

SPRING PLATE CONFIGURED TO OVERLAP WITH ASYMMETRIC/ECCENTRIC QUICK CHANGE KNIFE NUT FOR PROPER ASSEMBLY

BACKGROUND OF THE INVENTION

This invention relates generally to machines for severing standing crops from the ground using a plurality of rotatable discs having knives mounted thereon to sever standing crop by an impact action upon rotation of the discs and, more particularly, to an improved connector for attaching disc cutter knives to the machine that allows the knives to be easily removed from the rotatable discs and replaced.

Rotary disc cutterbars are well known in the agricultural arts and used in the harvest of a variety of standing crops. A typical disc cutterbar comprises a plurality of cutterheads spaced along the length of the cutterbar. The cutterheads each typically comprise a rotating cutting disc including diametrically opposed cutting blades (though configurations with three or more blades are known) driven by a drivetrain housed within the cutterbar that receives motive power from the prime mover to which the disc mower is attached. For background information on the structure and operation of some typical disc cutterbars, reference is made to U.S. Pat. No. 5,996,323, issued to Campbell, the descriptive portions thereof being incorporated herein in full by reference.

Cutterbars frequently impact rocks and other obstructions in a field which can damage the knives. Further, knives also become dulled by their interaction with the crop and require periodic removal for sharpening or replacement. Knife retention is traditionally accomplished through the use of threaded fasteners which require multiple components and involve time-consuming processes to remove and replace damaged or worn knives. Quick-change knife attachment systems are known wherein the knife is retained on a post-like retainer with a flange and prevented from disengagement by a spring overlapping a portion of the flange. Such arrangements require assembly of the parts in a precise orientation to assure that the knife retainer functions as intended. Prior designs, such as that disclosed in Applicant's pending application Ser. No. 13/667,887 filed on Nov. 2, 2012, could be assembled in multiple orientations which resulted in additional time during assembly to disassemble and reassemble in the correct orientation.

It would be advantageous to provide a locking mechanism for a quick-change knife attachment system that would highlight incorrectly oriented components during cutterhead assembly or wear part replacement to prevent incorrect assembly of the knife retainers. Additional advantages would be realized by a knife retainer system that did not increase the part count for the knife connection. Still further advantages would be realized by a quick-change knife attachment system that permits tool-free knife changes on a rotary cutterhead used on agricultural harvesting machines.

SUMMARY OF THE INVENTION

Accordingly, the present invention, in any of the embodiments described herein, may provide one or more of the following advantages:

It is an object of the present invention to provide a quick-release knife connector for use on a rotary disc cutterhead allows the knife to be easily removed and reinstalled while also providing a secure locking mechanism to prevent inadvertent knife release. The knife nut onto which the knives are fitted include an asymmetric design which places additional material to strengthen the area where the knife rides, the most wear-prone portion of the knife nut. The design of the locking mechanism assures that the knife nut is correctly oriented during installation so that the additional material is properly positioned when the rotary cutter operates.

It is a further object of the present invention to provide a quick-change knife connector for use on a rotary disc cutterhead which relies on a keyed connection to the rotary disc to limit the permissible orientations of the connector to the rotary cutterhead. The connector also features an asymmetric design which further limits the permissible orientations of the connection to a single orientation.

It is a further object of the present invention to provide a quick-change knife connector for use on a rotary disc cutterhead having a shaped knife nut with a first portion providing a bearing surface for an aperture in the knife and a second portion which inhibits axial movement of the knife from contact with the first portion. The second portion is asymmetrically positioned in relation to the first portion. A retainer spring plate is provided with an aperture positioned adjacent to the second such that the second portion partially protects into the aperture when the knife nut is oriented to its preferred orientation.

It is a further object of the present invention to provide a quick-change knife connector for use on a rotary disc cutterhead that is compatible with the knife connector provisions on current and past production cutterheads so that the improved quick change knife connectors can be easily retrofit onto older rotary disc cutterbars.

It is a still further object of the present invention to provide a quick-change knife connector for a rotary disc cutterhead configured to assure correct assembly that is durable in construction, inexpensive of manufacture, carefree of maintenance, easily assembled, and simple and effective to use.

These and other objects are achieved in accordance with the instant invention by providing a quick-release knife connector for use on a rotary disc cutterhead having a shaped knife nut with a first portion providing a bearing surface for an aperture in the knife and a second portion which inhibits axial movement of the knife from contact with the first portion. The second portion is asymmetrically oriented. A capture element including an aperture for partially receiving the second portion is configured so that the asymmetrical second portion will only be received when the connector is properly oriented on the cutterhead.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
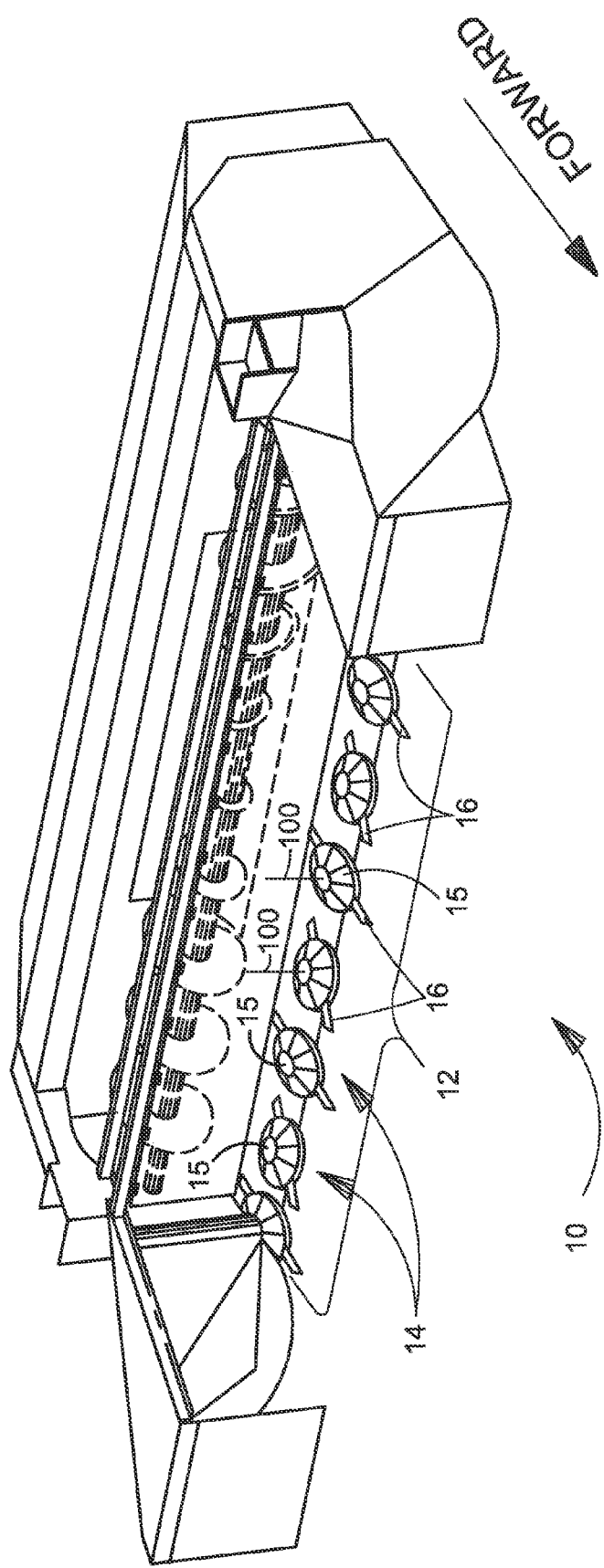
FIG. 1 is an perspective view of a conventional agricultural harvesting header having a transversely arranged rotary disc cutterbar on which the present invention is useful.
Figure 2:
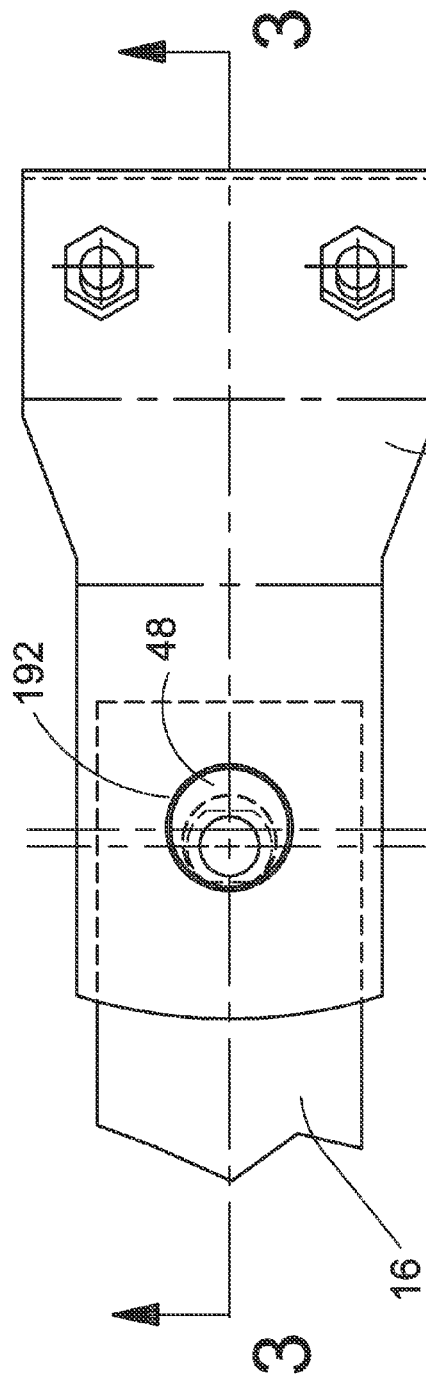
FIG. 2 is a partial view of the underside of a rotary disc cutterhead showing a first embodiment of a knife connection to the cutterhead.
Figure 3:
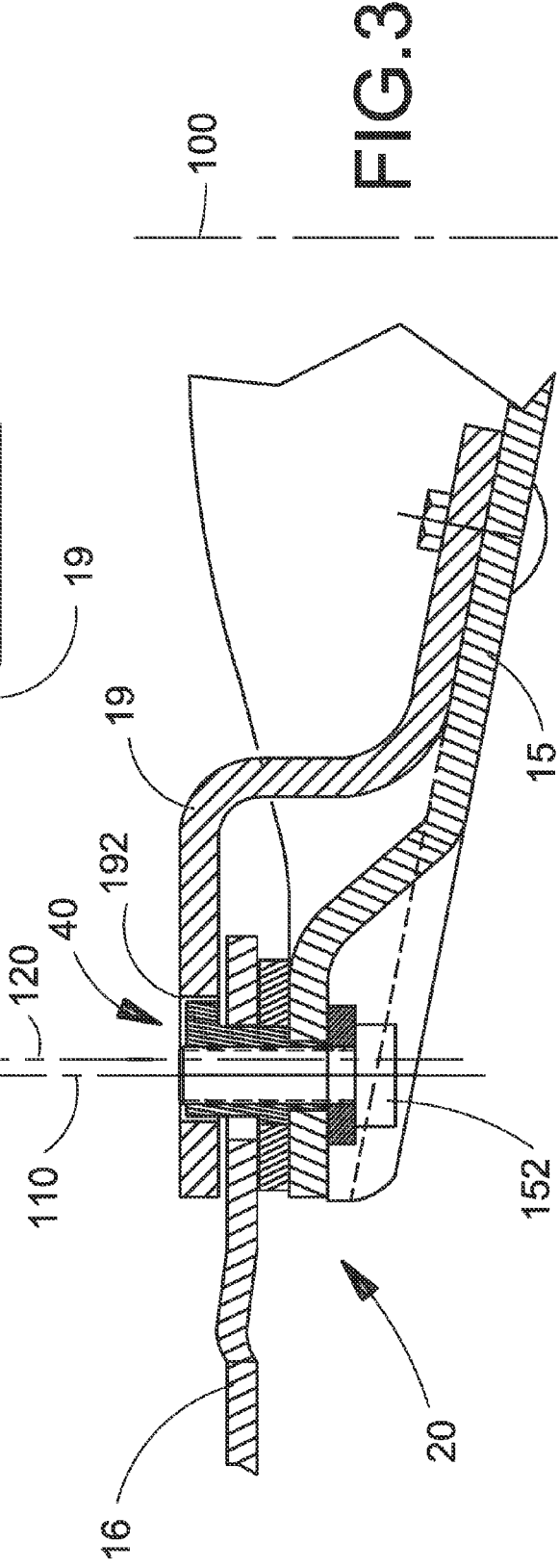
FIG. 3 is section view of the knife connection of FIG. 2 taken along cut line 3-3.
Figure 4:
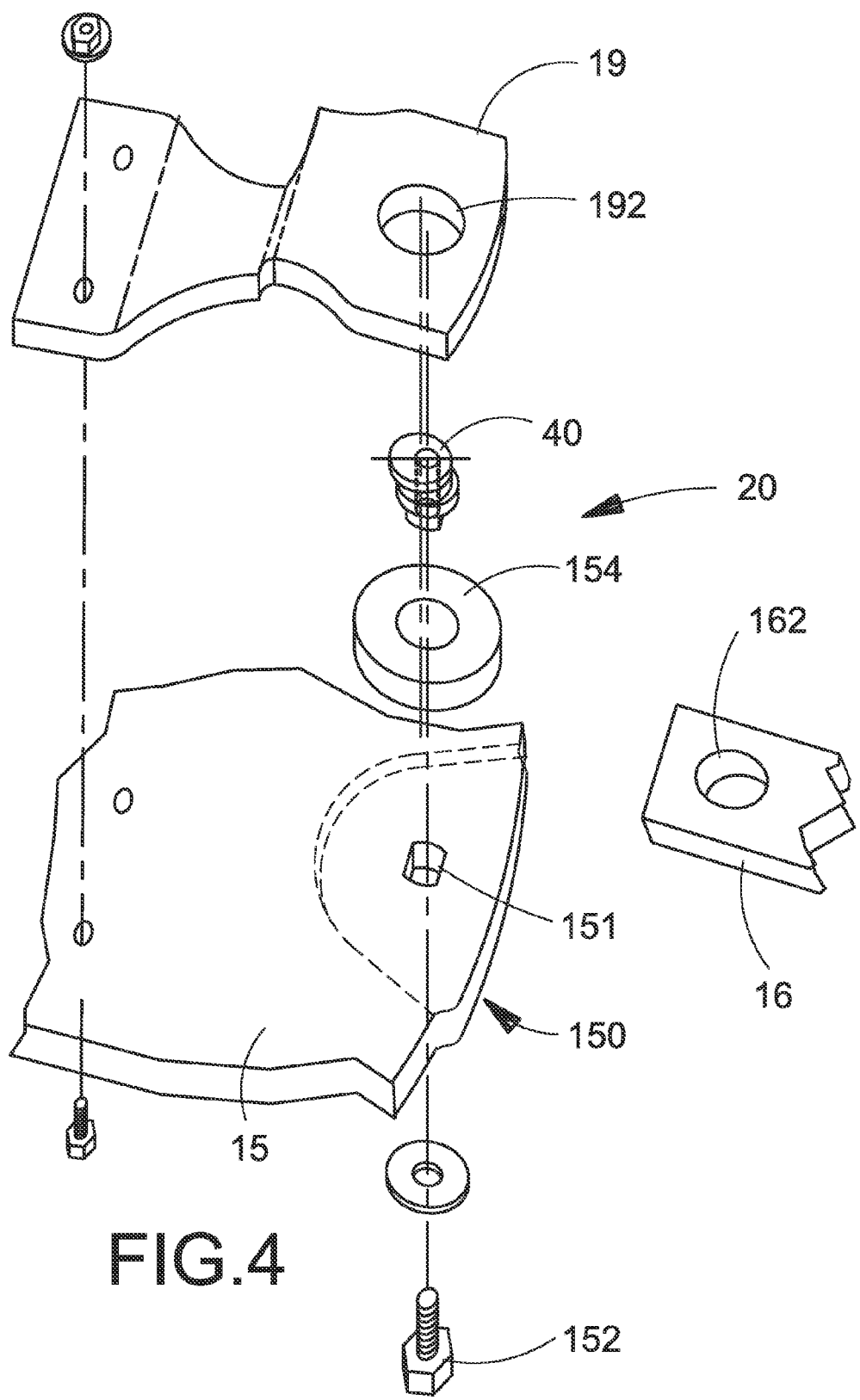
FIG. 4 is an exploded perspective view of the knife connection mechanism of FIG. 2.

Referring now to the drawings and particularly to FIG. 1, an agricultural harvesting header 10 having a forwardly disposed rotary disc cutterbar 12 is shown. The disc cutterbar 12 comprises a plurality of transversely spaced rotary disc cutterheads 14 generally spanning the transverse width of the mower. Each rotary disc cutterhead 14 comprises a rotating disc element 15 driven for rotation about a generally upstanding axis 100 by a gear train, and a plurality of knives 16 attached to the periphery of each rotating disc element for rotation therewith. For background information on the structure and operation of disc cutterbars, reference is made to U.S. Pat. No. 4,815,262, issued to Koch et al. and to U.S. Pat. No. 5,996,323, issued to Campbell et al., the descriptive portions thereof being incorporated herein in full by reference.

Now referring to FIGS. 2 through 5, each rotating disc element 15 further comprises a plurality of knife mounting connections 20 formed adjacent to the peripheral edge of the rotating disc element 15. A mounting hole 151 is provided in the disc element allow a through-bolt 152 to be inserted and engage a knife nut 40 to secure the knife nut 40 to one side of the disc element 15 adjacent to the peripheral end 150. The mounting hole 151 is preferably configured to limit the possible orientations that the knife nut may be received into the mounting hole and, once inserted, to prevent the knife nut from rotating. The knife nut 40 is configured to be engaged by a mounting aperture 161 provided in each knife 16 to connect the knife 16 to the rotating disc element 15. The mounting aperture 161 in the knife is preferably circular for ease in manufacture, but may also be shaped to enhance engagement with the knife nut during machine operation. A spacer 154 may be provided to prevent the knife 16 from bearing against the disc element 15.

A spring retainer 19 connected to the rotating disc element extends to a position spaced apart from the disc element 15 proximate to the knife nut 40. The retainer 19 includes an aperture 192 which is positioned to align to receive a portion of the distal end of the knife nut 40 so that the knife 16 engages the knife nut 40 between the disc element 15 and the retainer 19 and is captured therebetween which prevents the knife 16 from being inadvertently disconnected from the knife nut 40. The retainer 19 may be flexed away from the disc element 15 to expose the distal end of the knife nut in order to disengage the knife 16 from the knife nut 40. A similar retainer arrangement is disclosed in presently pending application Ser. No. 13/667,887, the descriptive portions being incorporated herein by reference.

Figure 5:
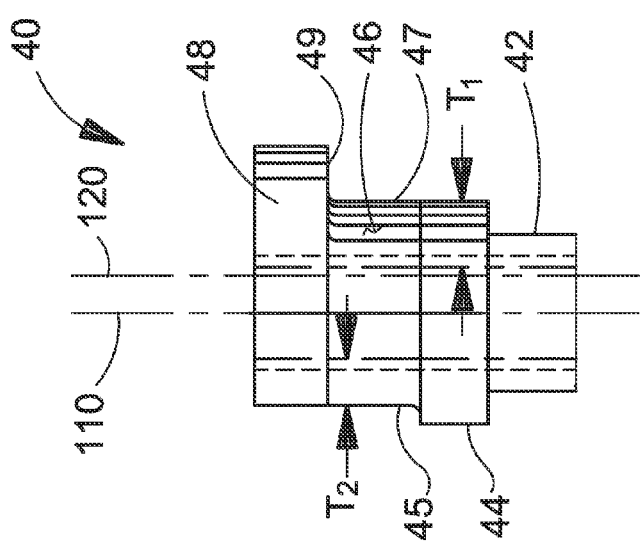
FIG. 5 is a detailed view of a knife connection nut of the connection mechanism.

The knife nut 40 is best illustrated in FIG. 5 as having a mounting shank 42 on its proximal end which is configured to be received in the mounting hole 151 on the disc element 15. The mounting hole is configured receive the knife nut 40 in a limited number of orientations symmetric about first axis 110, two in the illustration shown, and to prevent the knife nut from rotating once engaged in the mounting hole. The mounting hole 151 configuration shown in the figures has been used on Applicant's rotary disc cutters for many years and establishes a predefined interface configuration. By adhering to the interface configuration, the present invention may be easily retrofit onto existing machines without modification. A shoulder portion 44 is positioned adjacent to the mounting shank 42 to enable the knife nut 40 to be secured against the disc element by tensioning fastener 152 engaging a threaded hole in the knife nut along first axis 110.

A bearing portion 46 is provided to be received by the mounting aperture 161 provided in each knife 16. Unlike the shoulder portion 42 which is preferably symmetric about first axis 110, the bearing portion 46 is asymmetrically arranged about the first axis 110 resulting in a thick side 47 with a thickness shown as $T_1$ in FIG. 5, and a thin side 45 with a thickness shown as $T_2$ in FIG. 5 where $T_1$ is greater than $T_2$. The thick side 47 is installed oriented inwardly toward the center of rotation of the disc cutter (disc axis 100) so that centrifugal force will cause the knife to bear against the thick side 47 surface during normal operation of the disc cutterhead.

Figure 7:
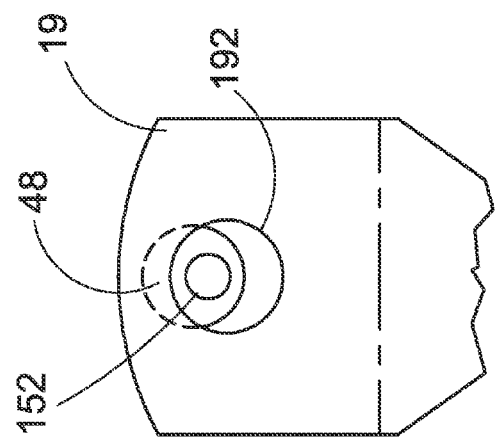
FIG. 7 is a view of the connection mechanism shown improperly oriented.
Figure 6:
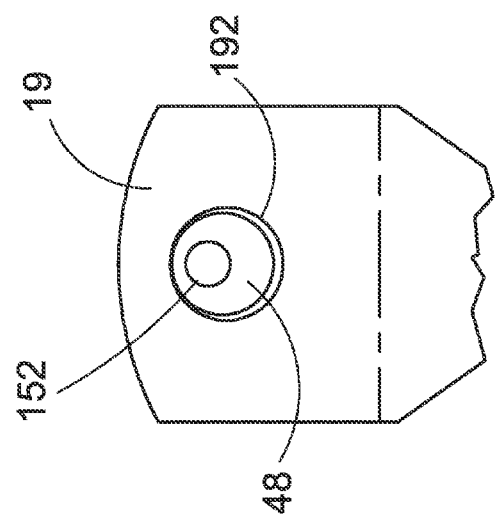
FIG. 6 is a view of the connection mechanism shown properly oriented.

A flange portion 48 is disposed on the distal end of the knife nut 40 having an flange face 49 that extends inwardly toward the cutterhead axis 100 beyond the extent of the thick side 47 to limit axial movement of the knife toward the distal end and keep the knife 16 positioned on the knife nut bearing portion 46 when the knife nut 40 is properly installed. The flange portion 48, when viewed from the distal end, is asymmetrically positioned in relation to the first axis 110, and symmetrically aligned with second axis 120 which parallel to and spaced apart inwardly from first axis 110. The flange portion 48 preferably is circular when viewed from the distal end with the center aligned on the second axis 120. The diameter of the flange portion 48 is slightly less than the inner diameter of both the mounting aperture 161 in the knife 16 and the aperture 192 on the retainer 19. Because of the offset of the flange 48 in relation to the first axis 110, the flange will only be aligned with the aperture 192 when the knife nut is oriented with the flange offset oriented inwardly (see FIG. 6). This preferred orientation assures that the thick side 47 of the bearing portion with its greater strength and wear tolerance is positioned to bear against the knife mounting aperture 161 while the machine is operating. Orienting the knife nut 40 in the opposite orientation results in the flange 48 being positioned so that it will not be received in the aperture (see FIG. 7) indicating to a mechanic that the knife nut is incorrectly installed. Because the retainer will not properly engage the knife nut 40, the mechanic will immediately recognize the problem and be able to correct.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. An apparatus for connecting a knife to a disc cutterbar rotary cutterhead on an agricultural machine comprising:
    a rotating disc having a mounting hole;
    a knife connector with a proximal connection end configured to be received in the mounting hole in one of a plurality of rotational orientations symmetric about a first axis, the knife connector having a bearing portion and a flange portion, the bearing portion and the flange portion each being asymmetrically positioned in relation to the first axis; and
    a spring retainer having an aperture for partially receiving the flange portion, the position of the aperture with respect to the first axis and the asymmetric position of the flange portion relative to the first axis and the proximal connection end limiting the plurality of rotational orientations of the knife connector in the mounting hole to a single rotational orientation for the flange portion to be received in the aperture.

2. The apparatus of claim 1, wherein the flange portion and the aperture are generally circular and centered about a second axis that is parallel to and spaced apart from the first axis.

3. The apparatus of claim 2, wherein the spring retainer may be deflected away from the flange portion to permit disengagement of the knife from the knife connector.

4. The apparatus of claim 3, wherein the plurality of rotational orientations of the knife connector about the first axis is equal to two.

5. A connection apparatus for removably attaching a knife to a rotary disc used on an agricultural mower cutterbar, the rotary disc being rotatable about an upstanding disc axis, the connection apparatus comprising:
    a knife mount connectable at a proximal end to the rotary disc in one of a plurality of rotational orientations symmetric about a first axis generally parallel to and spaced apart from the disc axis, the knife mount having a intermediately disposed bearing portion to which a mounting aperture in the knife may be engaged and a distally disposed flange portion for limiting axial movement of the knife engaged on the bearing portion, the mounting aperture sized to permit the flange portion to pass therethrough, the bearing portion being asymmetric about the first axis creating a normal contact area on the bearing portion, the flange portion being aligned on a second axis parallel to and spaced apart from the first axis; and
    a spring retainer connected to the rotatable disc and extending to a position proximate the distal end of the knife mount, the spring retainer having an aperture positioned to partially receive the flange portion to prevent axial disengagement of the knife from the knife mount, positioning of the aperture with respect to the first axis and the second axis limiting the plurality of rotational orientations to a single rotational orientation for the aperture to receive the flange portion.

6. The connection apparatus of claim 5, wherein the normal contact area is positioned inwardly toward the disc axis when the knife mount is in the single rotational orientation.

7. The connection apparatus of claim 6, wherein the spring retainer may be deflected away from the flange portion to permit disengagement of the knife from the knife mount.

8. The connection apparatus of claim 5, wherein the flange portion is symmetrically configured about the second axis.

* * * * *